July 23, 1929.  J. A. MATTESON  1,721,633
AUXILIARY AIR INTAKE
Filed Oct. 18, 1927

Inventor
John A. Matteson,

By Clarence A. O'Brien
Attorney

Patented July 23, 1929.

1,721,633

UNITED STATES PATENT OFFICE.

JOHN A. MATTESON, OF WATKINS, NEW YORK.

AUXILIARY AIR INTAKE.

Application filed October 18, 1927. Serial No. 226,967.

The present invention relates to auxiliary air intakes for internal combustion engines for a type such as disclosed by my co-pending application Serial No. 202,983 and has for its principal object a housing for the attachment having a by-pass connected therewith for supplying clean air from the air cleaner attached to the engine for feeding into the intake manifold of the engine.

The invention has for a further object to enclose the auxiliary air intake attachment to prevent dirt and grease from accumulating upon the valve forming a part of the auxiliary air intake attachment whereby to insure a perfect seating of the valve within the opening communicating with the intake manifold and thus provide for the more efficient operation of the device.

Another object is to provide a housing of this character of simple and practical construction, which may be installed in operative position without necessitating any changes or alterations in the construction of the engine, which is neat and attractive in appearance, relatively inexpensive to manufacture and otherwise well adapted for the purposes for which the same is intended.

Figure 1:
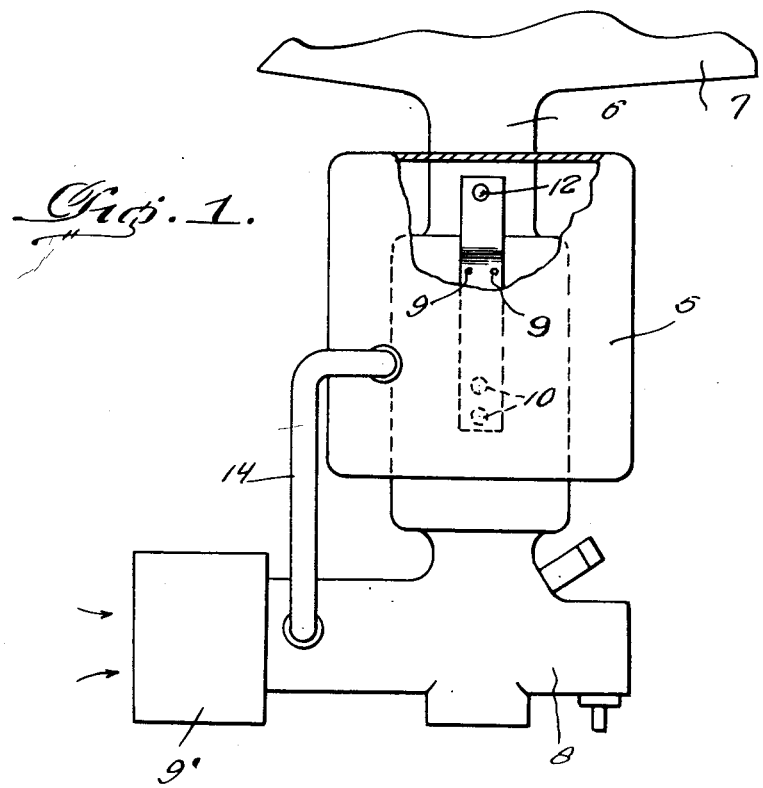
Figure 2:
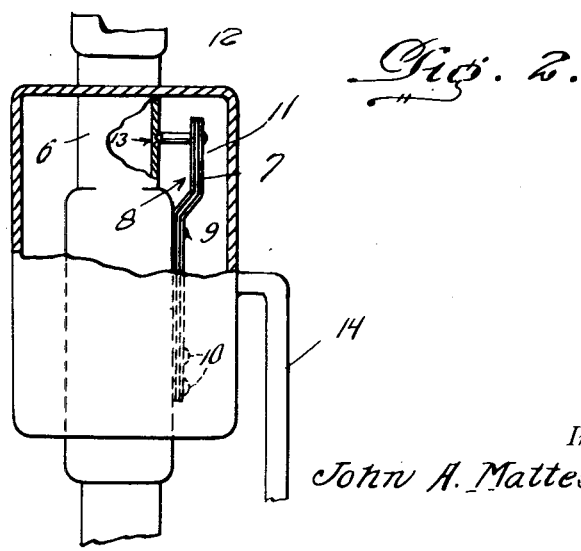

Other objects and advantages reside in the special construction and combination of the various elements comprising the invention, reference being had to the accompanying drawings forming a part hereof, wherein:

Figure 1 is a view in elevation showing the housing arranged in position upon the intake manifold of the engine and with parts broken away to illustrate the position of the automatic auxiliary air intake for the engine, and Figure 2 is a side elevational view thereof.

Referring now to the drawing in detail, I have shown my invention comprising a casing 5 of substantially rectangular formation and having an opening formed in its upper and lower sections through which the intake manifold pipe 6 of an internal combustion engine may be inserted, the casing thus forming a housing about the section of such pipe.

The upper end of the intake manifold pipe 6 connects with the intake manifold 7 with its lower end communicating with the carburetor 8, the casing 5 being thereby interposed therebetween. The carburetor is provided with the usual air cleaner 9' adapted to purify the air before feeding the same into the carburetor and between the air cleaner and carburetor is arranged a by-pass 14 in the form of a pipe section having one end attached to the air intake leading into the carburetor and its opposite end connected with the casing 5.

Within the casing is arranged an automatic auxiliary air intake regulator comprising a thermostat indicated at 6 composed of laminated layers of heat responsive metal and for instance an outer layer of iron 7 arranged in superimposed relation upon one or more layers of copper 8, the copper layer being disposed innermost with respect to the intake manifold pipe 6. The layers of material may be permanently secured in superimposed relation by means of rivets 9 or the like, and one end of the thermostat so constructed may be secured to the intake manifold pipe in a vertically extended position by screws 10, preferably forming its attachment therewith at its lower end.

The upper end of the thermostat is offset as indicated at 11 and as more clearly illustrated in Figure 2 of the drawings whereby to space the same away from the surface of the intake manifold pipe, said offset end being provided with an inwardly extending pin 12 constituting a valve normally seated within an opening 13 formed in the intake manifold pipe adjacent thereto. In view of the manner of freely mounting the upper end of the thermostat it is obvious that the same may be moved outwardly from the intake manifold pipe whereby to remove the pin 12 from its seat in the opening and permit air from within the housing to enter the intake manifold pipe. By reason of the construction of the thermostat of material which is responsive to the heat created by the running of the engine, the upper end of the thermostat consequently will have a tendency to move outwardly to cause the unseating of the valve to a sufficient extent to admit air therethrough. As soon as the temperature of the engine is reduced to a certain point, the thermostat will return to its normal position whereby to close the valve opening.

By providing the housing for the thermostat the same is enclosed against contact with dust or dirt which may enter the hood of the engine or grease which accumulates thereon due to the operation thereof. The by-pass 10 is accordingly provided for supplying air to the housing and which as understood is tacked to the air intake of the carburetor at a point for feeding air which has been previously purified and cleaned by the air cleaner indicated at 9.

It is obvious that the invention is susceptible of various changes and modifications, without departing from the spirit or scope of the invention or sacrificing any of its advantages, and I accordingly claim all such forms of the device to which I am entitled.

Having thus described my invention, what I claim as new is:

In combination, an automatic control for an auxiliary air intake attachable to the intake manifold of an internal combustion engine, a housing carried by the manifold forming a closure for said auxiliary air intake and a feed pipe communicating with the housing and connected with the air intake of the carburetor of the engine.

In testimony whereof I affix my signature.

JOHN A. MATTESON.